United States Patent
Laredo et al.

(10) Patent No.: US 9,886,247 B2
(45) Date of Patent: Feb. 6, 2018

(54) USING AN APPLICATION PROGRAMMING INTERFACE (API) DATA STRUCTURE IN RECOMMENDING AN API COMPOSITE

(71) Applicant: International Business Machines Corporation, Armonk, NY (US)

(72) Inventors: Jim A. Laredo, Katonah, NY (US); Sriram K. Rajagopal, Chennai (IN); Maja Vukovic, New York City, NY (US)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 14/527,839

(22) Filed: Oct. 30, 2014

(65) Prior Publication Data

US 2016/0125042 A1    May 5, 2016

(51) Int. Cl.
  *G06F 17/30*   (2006.01)
  *G06F 9/44*    (2006.01)

(52) U.S. Cl.
  CPC .......... *G06F 8/38* (2013.01); *G06F 8/33* (2013.01); *G06F 17/30477* (2013.01); *G06F 9/4443* (2013.01)

(58) Field of Classification Search
  None
  See application file for complete search history.

(56) References Cited

U.S. PATENT DOCUMENTS

| | | | |
|---|---|---|---|
| 7,058,655 B2 | 6/2006 | Goldberg et al. |
| 8,509,811 B2 | 8/2013 | Phillips |
| 2003/0135503 A1 | 7/2003 | Goldberg et al. |
| 2004/0122926 A1 | 6/2004 | Moore et al. |

(Continued)

FOREIGN PATENT DOCUMENTS

| | | |
|---|---|---|
| WO | 0070481 A1 | 11/2000 |
| WO | 2008111051 A2 | 9/2008 |

(Continued)

OTHER PUBLICATIONS

"Cluster analysis," Wikipedia Foundation, Inc., dated Jan. 16, 2014, 17 pages, accessed Jan. 16, 2014, en.wikipedia.org/wiki/Cluster_analysis.

(Continued)

*Primary Examiner* — Richard Bowen
(74) *Attorney, Agent, or Firm* — Nicholas D. Bowman

(57) ABSTRACT

An application programming interface (API) exploration data structure is used in presenting an API composite to a first entity. A query associated with a topic is received from the first entity. A portion of the data structure is accessed. The accessed portion includes nodes that represent entities, nodes that represent APIs, and edges that represent relationships between nodes. A similarity score is calculated for each entity using a comparison to the first entity. Each similarity score is then compared to a threshold. A first network including each entity that has a similarity score above the threshold is generated. An API group including each API that has a relationship with the first network is generated. The API composite is identified based on the topic. As identified, the API composite includes an API of the related API group. The API composite is presented to the first entity.

20 Claims, 9 Drawing Sheets

(56) References Cited

U.S. PATENT DOCUMENTS

| | | | | |
|---|---|---|---|---|
| 2007/0143128 | A1* | 6/2007 | Tokarev | G06Q 10/10 |
| | | | | 705/347 |
| 2007/0150801 | A1* | 6/2007 | Chidlovskii | G06F 17/2247 |
| | | | | 715/210 |
| 2008/0221867 | A1 | 9/2008 | Schreiber | |
| 2008/0288965 | A1* | 11/2008 | Grechanik | G06F 8/36 |
| | | | | 719/328 |
| 2009/0235285 | A1* | 9/2009 | Kim | G06F 17/30961 |
| | | | | 719/328 |
| 2012/0095956 | A1* | 4/2012 | Xiong | G06Q 10/067 |
| | | | | 707/600 |
| 2012/0233165 | A1 | 9/2012 | Kirkpatrick | |
| 2013/0055211 | A1 | 2/2013 | Fosback et al. | |
| 2014/0052681 | A1 | 2/2014 | Nitz et al. | |
| 2014/0366000 | A1* | 12/2014 | Batabyal | G06F 8/61 |
| | | | | 717/120 |
| 2015/0254561 | A1* | 9/2015 | Singal | G06F 17/30507 |
| | | | | 707/713 |

FOREIGN PATENT DOCUMENTS

| | | |
|---|---|---|
| WO | 2013056104 A1 | 4/2013 |
| WO | 2013096506 A1 | 6/2013 |

OTHER PUBLICATIONS

"Graph Based Recommendation Systems at eBay," Planet Cassandra, Mar. 25, 2013, 18 pages, accessed Jan. 15, 2014, http://www.slideshare.net/planetcassandra/e-bay-nyc.

"Web API," Wikipedia Foundation, Inc., dated Dec. 7, 2013, 2 pages, accessed Jan. 14, 2014, en.wikipedia.org/wiki/Web_API.

Belhajjame et al., "PROV-O: The PROV Ontology," W3C, Apr. 30, 2013, 71 pages, accessed Feb. 10, 2014, http://www.W3.org./TR/prov-o/.

Buse, R., "A Human-Centric Approach to Program Understanding," Ph.D. Dissertation Proposal, Apr. 6, 2010.

Chen et al., "Mashup by Surfing a Web of Data APIs," VLDB '09, Aug. 24-28, 2009, Lyon, France, © 2009 VLDB Endowment, ACM 978-1-60558-949-7/09/08.

Chowdhury et al., "Efficient, Interactive Recommendation of Mashup Composition Knowledge," G. Kappel, Z. Maamar, H.R. Motahari-Nezhad (Eds.): ICSOC 2011, LNCS 7084, pp. 374-388, 2011, © Springer-Verlag Berlin Heidelberg 2011.

Cohen et al., "A Comparison of String Distance Metrics for Name-Matching Tasks," Proceedings of the Eighteenth International Joint Conference on Artificial Intelligence (IJCAI-03) Workshop on Information Integration, Aug. 2003, pp. 73-78.

Dojchinovski, M. et al, "Personalised Graph-Based Selection of Web APIs," Web Engineering Group, Faculty of Information Technology, Czech Technical University in Prague, Digital Enterprise Research Institute, National University of Ireland, Galway, P. Cudr'e-Mauroux et al. (Eds.): ISWC 2012, Part I, LNCS 7649, pp. 34-48, 2012, Copyright Springer-Verlag Berlin Heidelberg 2012.

Foggia et al., "A Graph-Based Clustering Method and Its Applications," Advances in Brain, Vision, and Artificial Intelligence, Jan. 2007, pp. 277-287, © Springer-Verlag Berlin Heidelberg.

Gantner et al., "RPG: APIs," IBM Redbooks, Dec. 2007, pp. 1-78.

Georgescu, "WSRP-Enabled Distributed Data Mining Services Deliverable over a Knowledge-Driven Portal," Proceedings of the 7th WSEAS International Conference on Applied Computer & Applied Computational Science, Apr. 2008, pp. 150-155.

Hassan, A. et al, "Software Intelligence: The Future of Mining Software Engineering Data," FoSER 2010, Nov. 7-8, 2010, Santa Fe, New Mexico, USA, Copyright 2010 ACM 978-1-4503-0427-6/10/11.

Huang et al., "Service Recommendation in an Evolving Ecosystem—A Link Prediction Approach," IEEE 20th International Conference on Web Services (ICWS), Jun.-Jul. 2013, pp. 507-514.

Kawaji et al., "Graph-based clustering for finding distant relationships in a large set of protein sequences," Bioinformatics, vol. 20, No. 2, Jan. 2004, pp. 243-252.

Laredo et al., "Use of Collected Data for Web API Ecosystem Analytics," U.S. Appl. No. 14/302,517, filed Jun. 12, 2014.

Laredo et al., "Continuous Collection of Web API Ecosystem Data," U.S. Appl. No. 14/302,756, filed Jun. 12, 2014.

Lee et al., "A Generic Graph-based Multidimensional Recommendation Framework and its Implementations," Proceedings of the 21st International Conference Companion on World Wide Web, Apr. 2012, pp. 161-165.

Moore et al., "WebSphere Business Integration Server Foundation Using the Programming API and the Common Event Infrastructure," IBM Redbooks, Apr. 2005, 240 pages.

Nguyen, H. et al., "A Graph-based Approach to API Usage Adaptation," OOPSLA/SPLASH'10, Oct. 17-21, 2010, Reno/Tahoe, Nevada, USA, © 2010 ACM 978-1-4503-0203-6/10/10.

Popov, "Release Update: The new Apiphany Analytics Systems is here!" Apiphany, Apr. 9, 2013, 4 pages. Accessed Feb. 10, 2014, http://apiphany.com/blog/release-update-the-new-apiphany-analytics-system-is-here.

Riabov et al., "Wishful Search: Interactive Composition of Data Mashups," WWW 2008/Refereed Track: Web Engineering—Web Service Composition, Apr. 21-25, 2008, Beijing, China, ACM 978-1-60558-085-2/08/04.

Rodriguez, "A Graph-Based Movie Recommender Engine," Sep. 22, 2011, 12 pages. Accessed Jan. 15, 2014, http://markorodriguez.com/2011/09/22/a-graph-based-movie-recommender-engine/.

Schaeffer, "Graph clustering," Computer Science Review, vol. 1, No. 1, Aug. 2007, pp. 27-64, geza.kzoo.edu/~erdi/patent/Schaeffer07.

Torres, R. et al, "Improving Web API Discovery by Leveraging Social Information," 2011 IEEE International Conference on Web Services, 978-0-7695-4463-2/11, © 2011 IEEE DOI 10.1109/ICWS.2011.96.

Uddin, Gias, et al., "Analyzying Temporal API Usage Patterns," 978-1-4577-1639-3/11, 2011 IEEE ASE 2011, Lawrence, KS, USA.

Wang et al., "Graph-Based Recommendation on Social Networks," IEEE 12th International Asia-Pacific Web Conference (APWEB), Apr. 2010, pp. 116-122.

Wittern et al., "A Graph-based Data Model for API Ecosystem Insights," Proceedings of the 21st IEEE International Conference on Web Services (ICWS), Jun.-Jul. 2014, 8 pages.

Xu et al., "A Model-based Approach to Attributed Graph Clustering," Proceedings of the 2012 ACM SIGMOD International Conference on Management of Data, © 2012 ACM, May 2012, 12 pgs.

Zhang, C. et al., "Automatic Parameter Recommendation for Practical API Usage," Department of Computer Science and Engineering, School of Software, Shanghai Jiao Tong University, China, 978-1-4673-1067-3/12/, 2012 IEEE 826 ICSE 2012, Zurich, Switzerland.

Zhong, H. et al., "MAPO: Mining and Recommending API Usage Patterns," S. Drossopoulou (Ed.): ECOOP 2009, LNCS 5653, pp. 318-343, 2009, c Springer-Verlag Berlin Heidelberg 2009.

Zhou et al., "Graph Clustering Based on Structural/Attribute Similarities," Proceedings of the VLDB Endowment, Aug. 2009, 12 pgs.

Laredo et al., "Graph-based Data Model for API Ecosystem Insights," U.S. Appl. No. 14/180,686, filed Oct. 31, 2013.

Laredo et al., "Bundling Application Programming Interfaces," U.S. Appl. No. 14/198,780, filed Mar. 6, 2014.

* cited by examiner

US 9,886,247 B2

1

USING AN APPLICATION PROGRAMMING INTERFACE (API) DATA STRUCTURE IN RECOMMENDING AN API COMPOSITE

BACKGROUND

The present disclosure relates to application programming interface (API) exploration data structures, and more specifically, to using API exploration data structures in recommending API composites.

APIs are increasingly being used in many areas of business and technology to provide high-speed, scalable business solutions. As used herein, APIs may refer to routines, protocols, or other tools that are usable in program development. APIs may serve to specify how software components should interact. More specifically, APIs may refer to Web APIs which are world-wide-web protocol based calls between programs. Web APIs may include a programmatic interface to a defined request-response message system that is exposed via the Internet.

SUMMARY

According to embodiments of the present disclosure, aspects of the disclosure may include a method, a system, and a computer program product for using an application programming interface (API) exploration data structure in presenting an API composite to a first entity. Using the API exploration data structure may begin by receiving an input query associated with a topic from the first entity. Based upon the input query, at least a portion of the API exploration data structure may be accessed. The accessed portion may include nodes that represent a set of entities, nodes that represent a set of APIs, and edges that represent relationships between the nodes. A similarity score may be calculated for each particular entity of the set of entities. Each particular entity's similarity score may be calculated by comparing that particular entity's relationships to the first entity's relationships. Each similarity score may then be compared to a threshold. A first network may then be generated by grouping together entities that have similarity scores above the threshold. A related API group may then be generated by grouping together APIs that have relationships with the first network. An API composite may then be identified based on the topic. As identified, the API composite may include at least one API of the related API group. The API composite may then be presented to the first entity.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

2 depicting a usage relationship edge, a social relationship edge, and a composite relationship edge, in accordance with embodiments of the present disclosure.

Figure 3A:
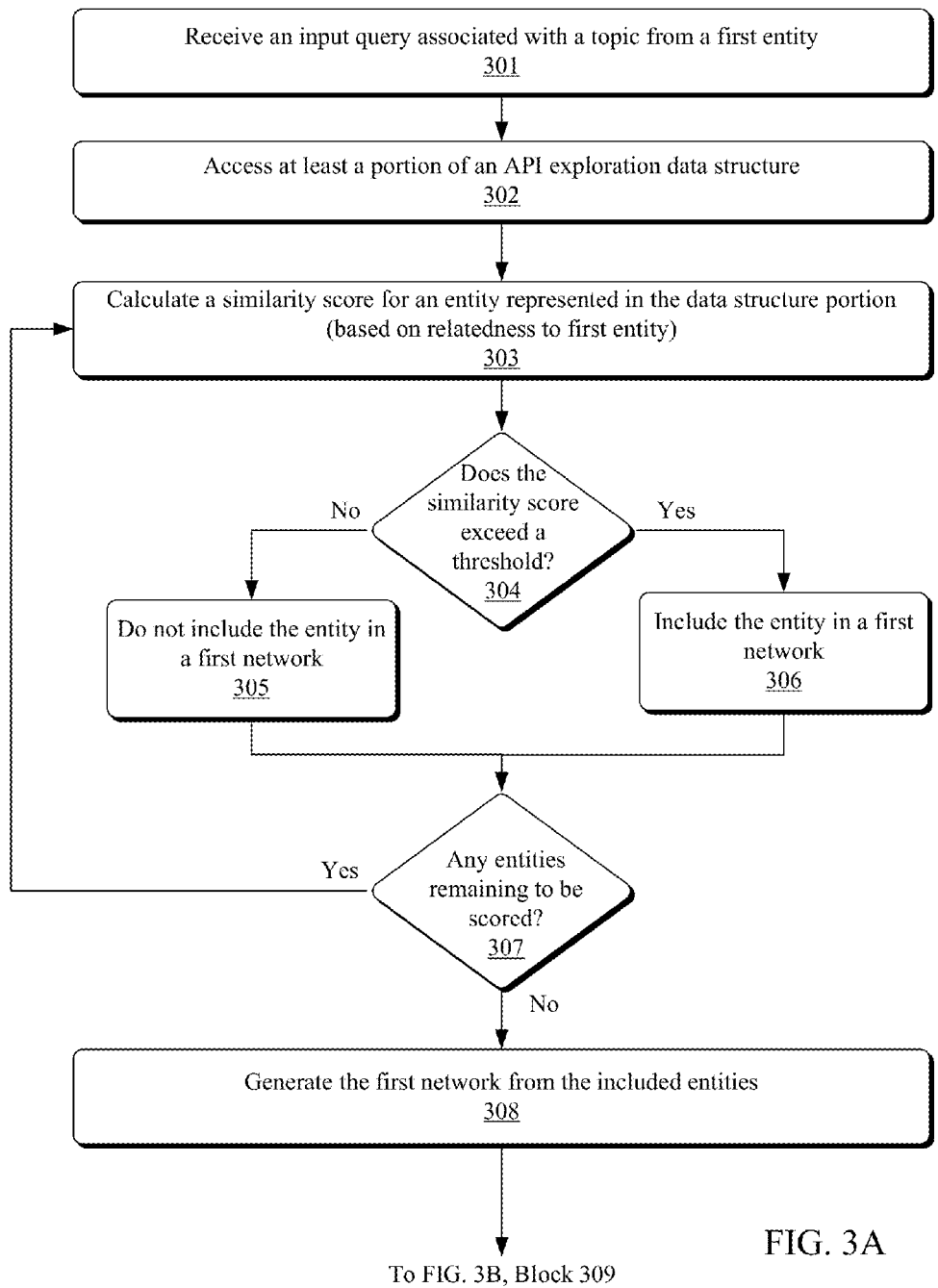

FIG. 3A illustrates a first section of a flowchart of an example method for recommending an API composite using an API exploration data structure, in accordance with embodiments of the present disclosure.

Figure 3B:
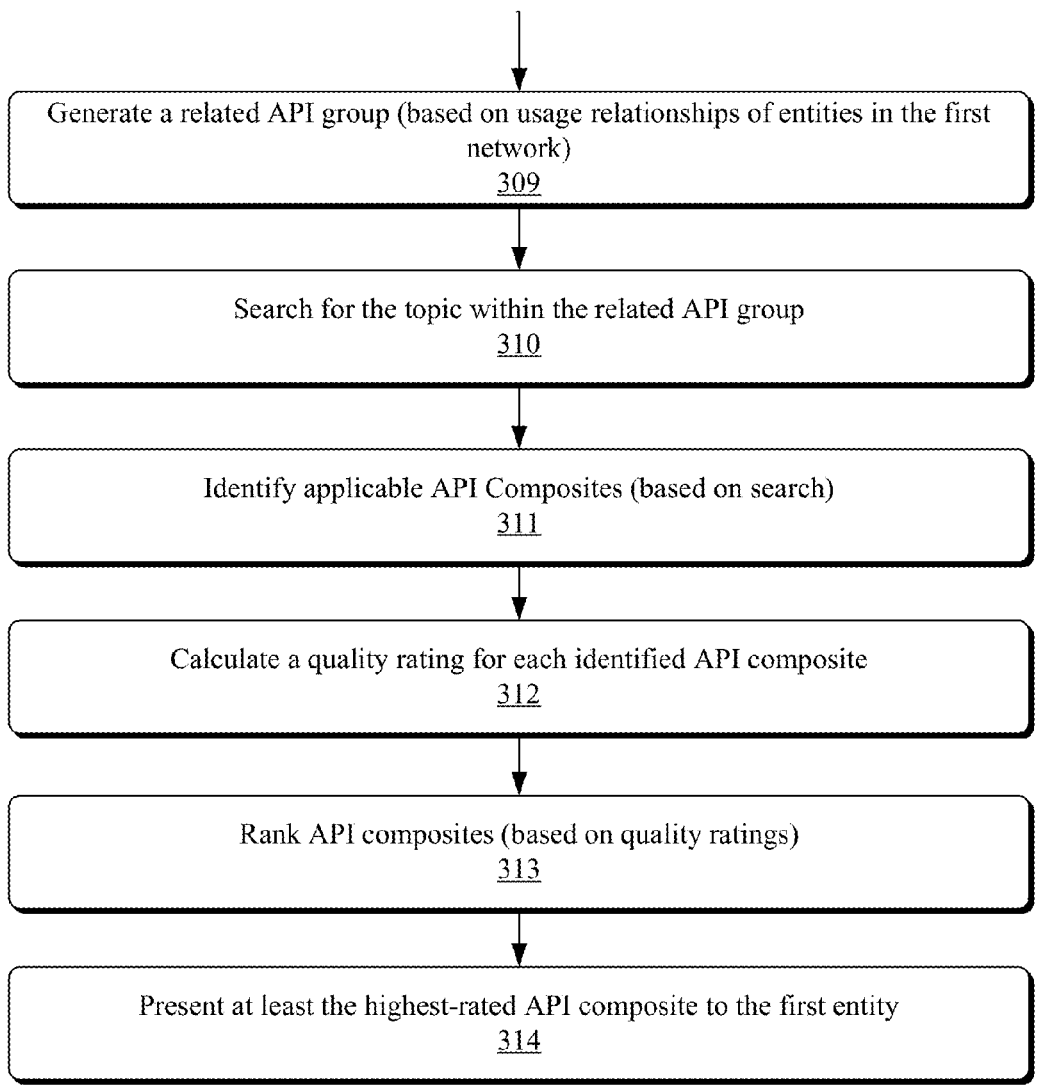

FIG. 3B illustrates a second section of the flowchart shown in FIG. 3A, in accordance with embodiments of the present disclosure.

Figure 4:
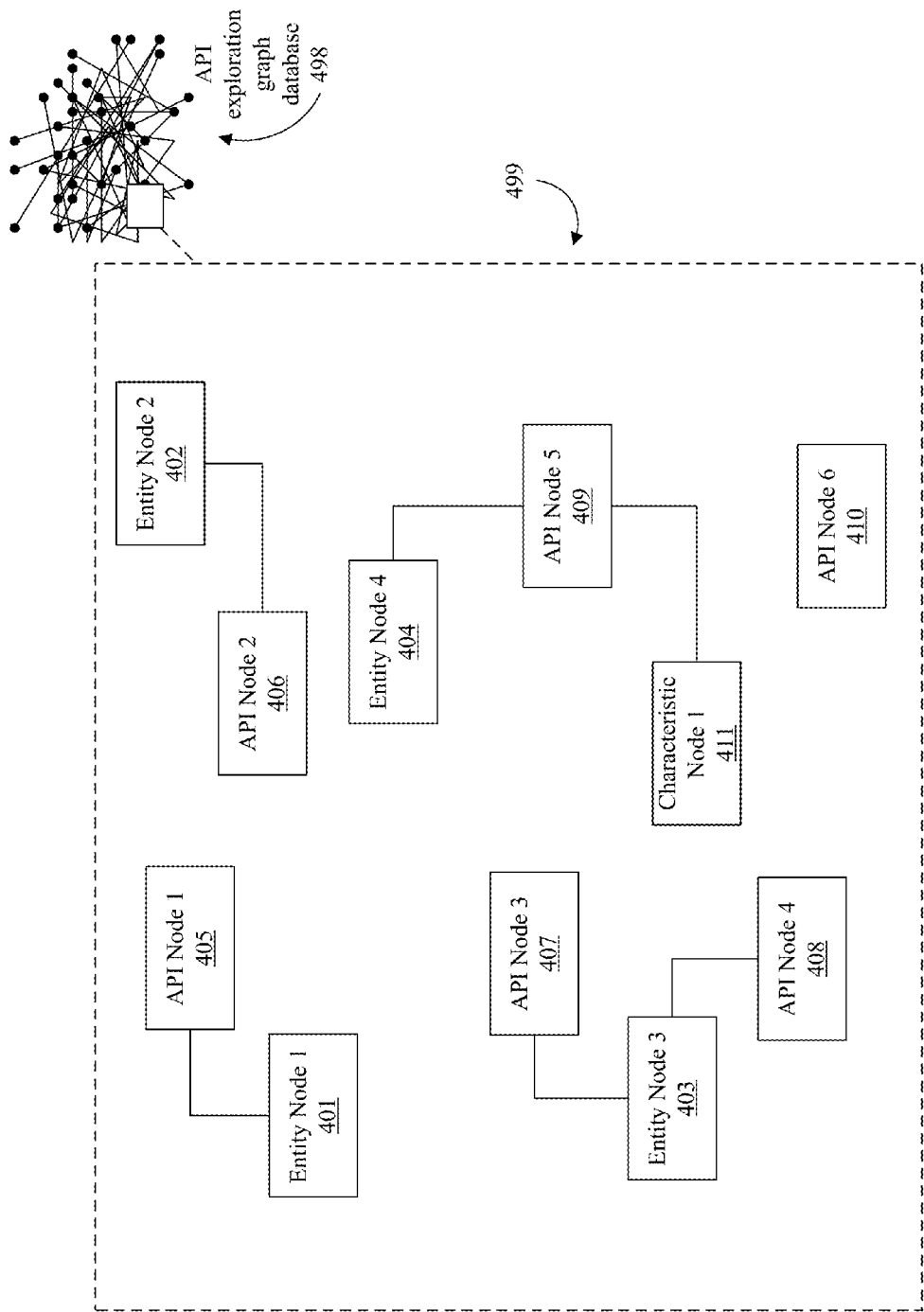

FIG. 4 illustrates a close-up view of a portion of a second example API exploration graph database, the close-up view depicting relationships between four entity nodes, six API nodes, and one characteristic node, in accordance with embodiments of the present disclosure.

Figure 5:
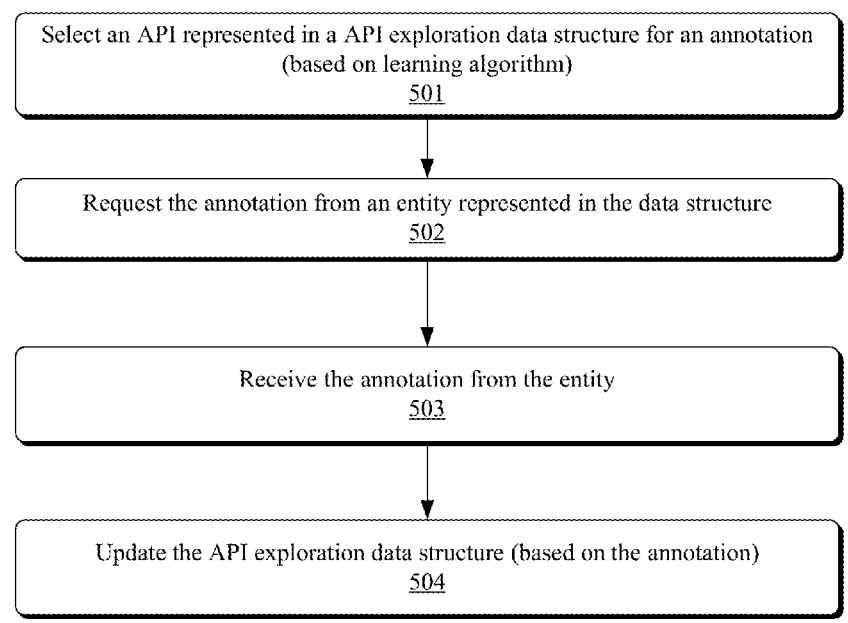

FIG. 5 illustrates a flowchart of an example method for using active learning to improve an API exploration data structure, in accordance with embodiments of the present disclosure.

Figure 6:
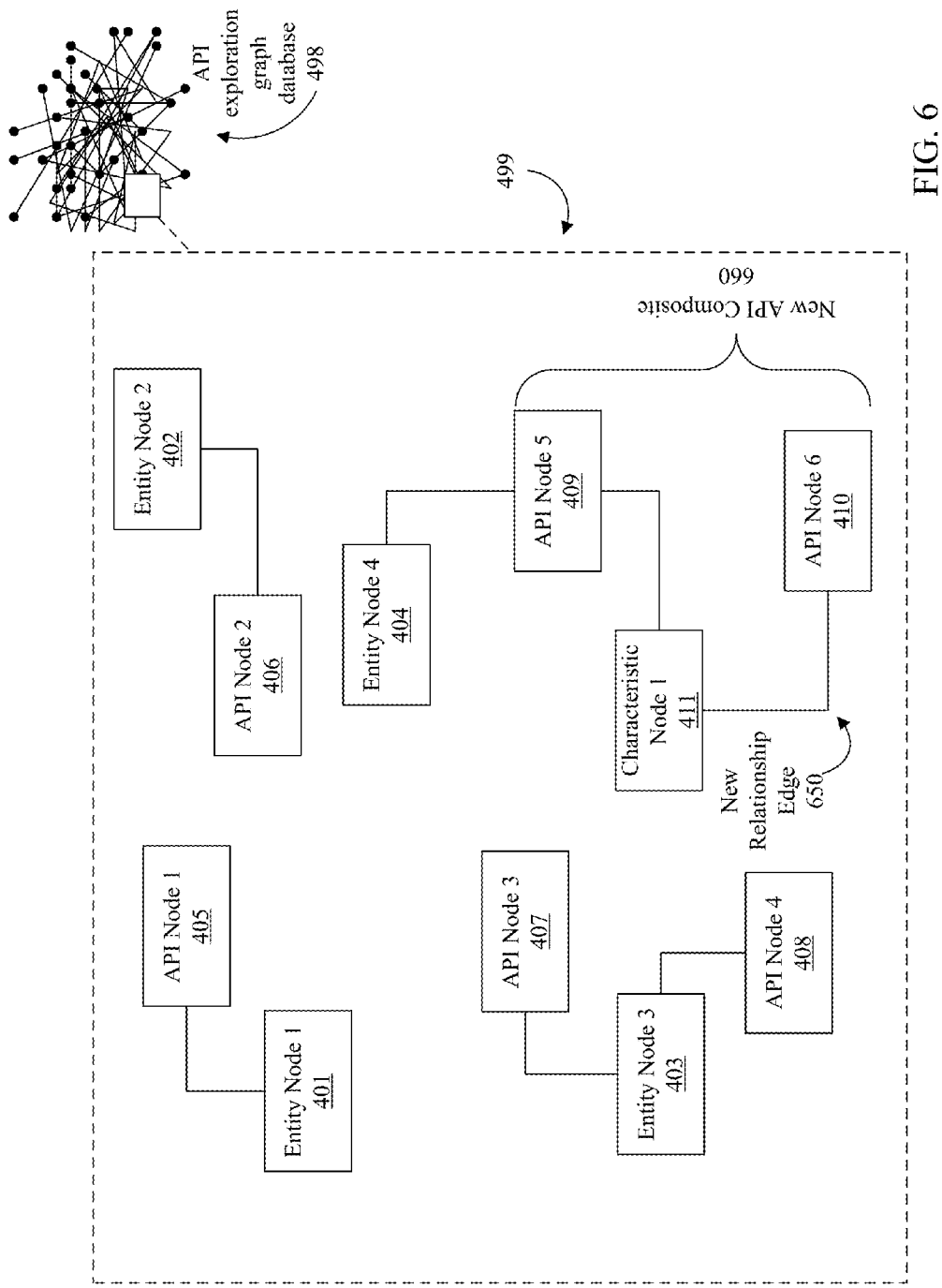

FIG. 6 illustrates a second close-up view of the portion of the example API exploration graph database illustrated in FIG. 4, wherein the API exploration graph database has been updated using active learning, in accordance with embodiments of the present disclosure.

Figure 7:
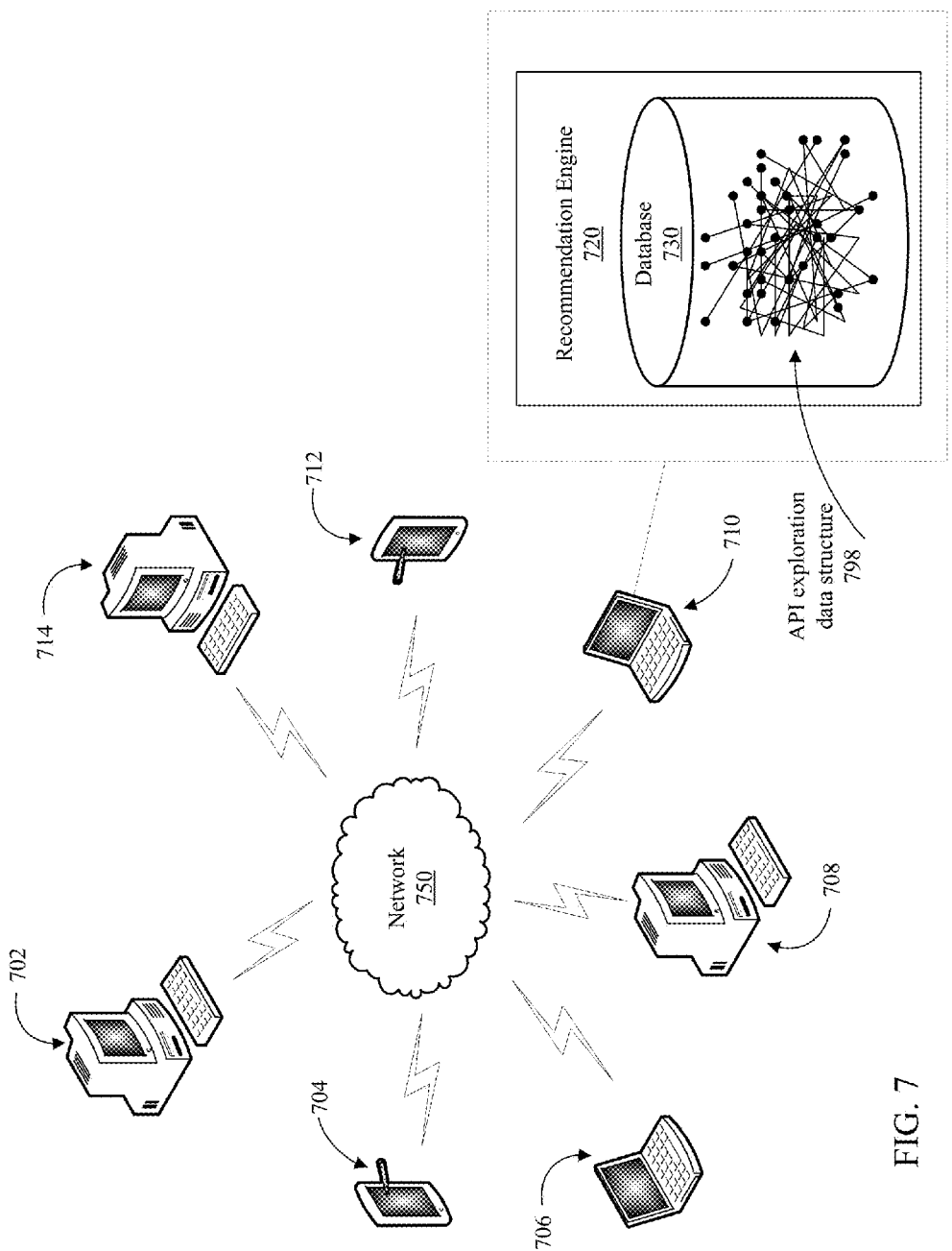

FIG. 7 illustrates a high-level diagram of an example computer network configured to perform one or more of the methods described herein, in accordance with embodiments of the present disclosure.

Figure 8:
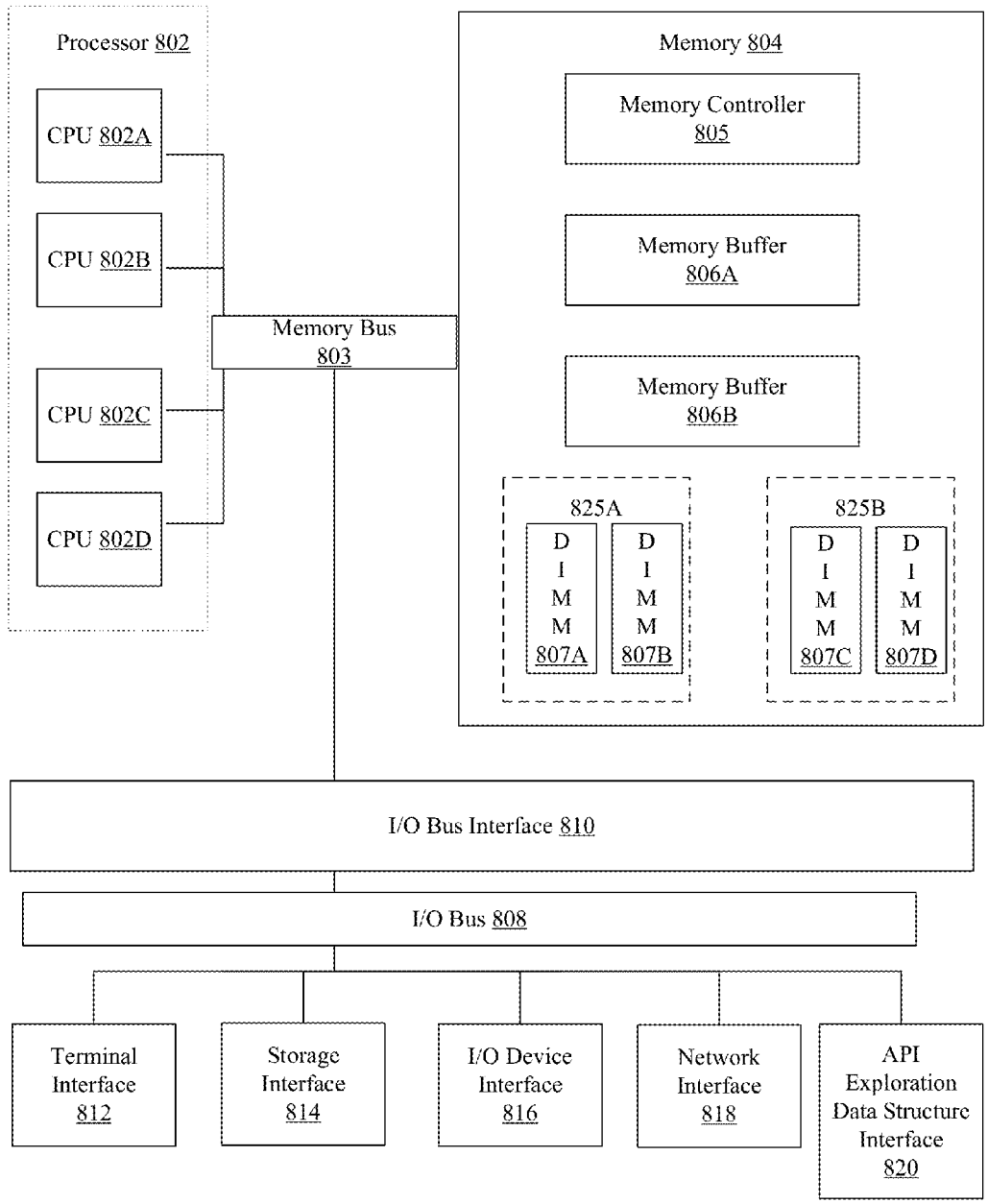

FIG. 8 illustrates a high-level block diagram of an example computer system that may be used in implementing one or more of the methods described herein, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to application programming interface (API) exploration data structures, and more specifically, to using API exploration data structures in recommending API composites. While the present disclosure is not necessarily limited to such applications, various aspects of the disclosure may be appreciated through a discussion of various examples using this context.

In the development of new programs, having the ability to choose from many APIs can be a significant advantage, both in terms of the quality of the end product and the time to completion. On the other hand, having more APIs can also lead to challenges in finding a particular API or set of APIs, or an API that is associated with a particular topic. As the number of APIs available in a given API ecosystem increase, so too may the search costs associated with sorting through the API ecosystem. There may, however, be ways of reducing these search costs.

In some embodiments of the present disclosure, an API exploration data structure may be used to model relevant components in an API ecosystem, as well as the relationships between these components. By including information continuously collected about the API ecosystem, the amount and type of data represented in such an API exploration data structure may be great. In some embodiments, this API exploration data structure may take the form of an API exploration graph database. Further, in some embodiments, such an API exploration data structure may be useful in making recommendations of APIs (or sets of APIs) represented in the API exploration data structure to entities also represented in the API exploration data structure (e.g., software developers, API consumers, etc.).

In some embodiments wherein an API exploration data structure is used to make an API recommendation to a particular entity, a network of entities that are similar to that particular entity may be generated (e.g., identified, defined, etc.). The network may then be used to narrow the scope of APIs that are reviewed (e.g., searched) when seeking an API for that particular entity. Further, in some embodiments, API exploration data structures may not only be usable for recommending individual APIs, they may also be useful for identifying and recommending particular sets of one or more related APIs to entities. These sets of APIs, which are referred to herein as API composites, may, in some embodiments, provide composite functionalities that may be valuable to certain entities. Furthermore, in some embodiments, API exploration data structures may be updated or otherwise modified by using active learning. More specifically, software on a computer (e.g., a recommendation engine) may determine which components represented in the API exploration data structure are best suited for additional labeling and may present those components to one or more entities for annotation.

Figure 1:
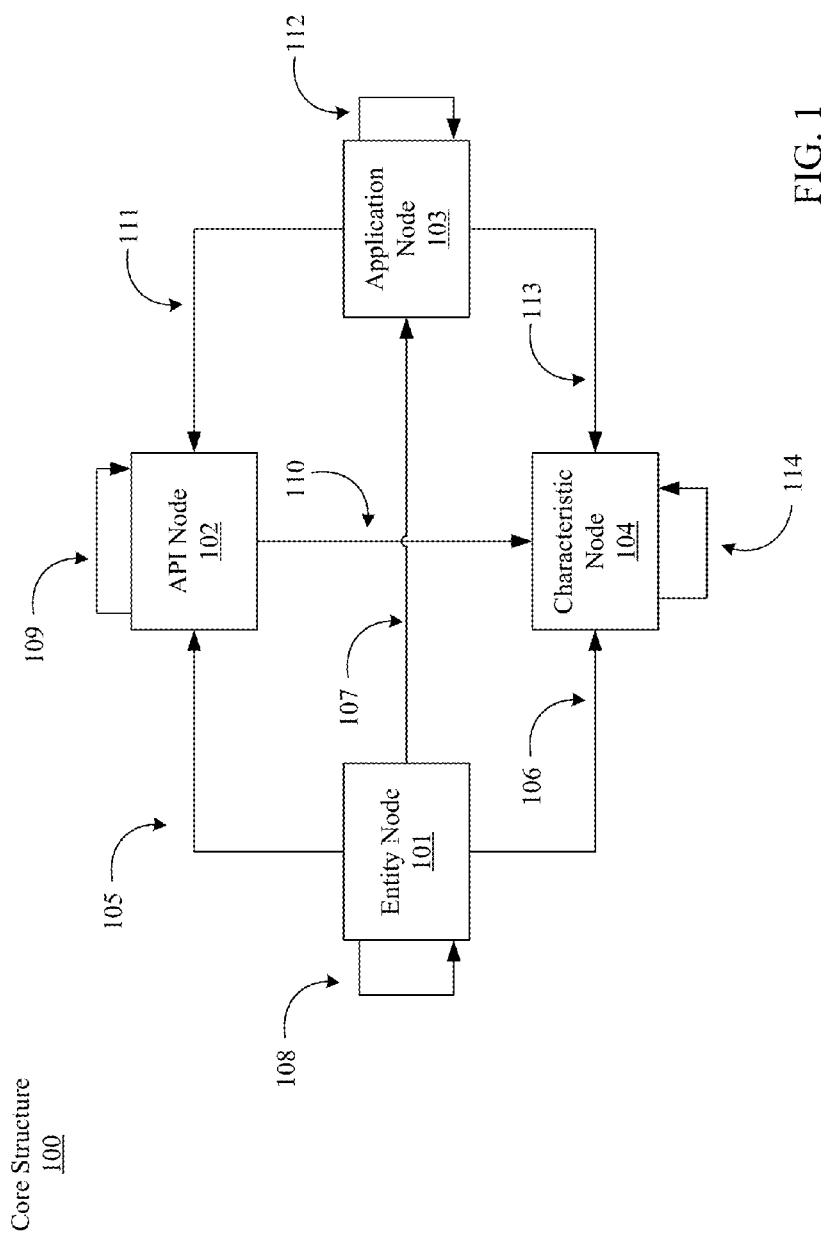
FIG. 1 illustrates a simplified, example core structure of an application programming interface (API) exploration graph database that may be utilized in API composite recommendation, in accordance with embodiments of the present disclosure.

Turning now to FIG. 1, shown is a simplified, example core structure 100 of an API exploration graph database that may be utilized in API composite recommendation, in accordance with embodiments of the present disclosure. Included in core structure 100 are four example node types 101-104, which are connected by ten example edge types 105-114. In some embodiments, an API exploration graph database that includes at least some of these ten types of edges and four types of nodes may allow for known relationships between nodes to be captured, while at the same time allowing for future extensibility when other relationships become apparent. Moreover, in some embodiments, as the expected use of APIs evolve through time, the activation and deactivation of relationships may be tracked and recorded. Furthermore, in some embodiments, the core structure may be defined as a property graph, in which both nodes and edges (representing relationships between nodes) have properties specified as key-value pairs.

Within core structure 100, entity node 101 may represent a person or organization that interacts with the API ecosystem. In some embodiments, it may represent web developers or programmers (e.g., entities that devise and implement sets of rules used to create APIs). Further, an entity node 101 may represent a consumer of developed applications. API node 102 may represent an API that is available within or is otherwise relevant to the API ecosystem. Application node 103 may represent an application that is relevant to the API ecosystem. In some embodiments, applications may include programs that rely on APIs available within the API ecosystem. Further, in some embodiments, applications may include mash-ups. As used herein, mash-ups may refer to web applications that combine multiple APIs in order to deliver specific, and potentially complex, functionalities.

Another type of node, characteristic node 104, represents a characteristic (e.g., feature) that may be potentially shared among entities, APIs, and applications. For example, characteristic nodes may represent categories like "social" or "location-based", data formats like "JSON" or "XML", or qualities like "cost per request" or "availability". Further, in some embodiments, the concrete value that an entity node 101, API node 102, or application node 103 has with regard to a characteristic node 104 may be denoted in the properties of a feature relationship edge (e.g., edge types 106, 110, or 113). For example, in some embodiments, an API-characteristic feature relationship edge 110 may connect a given API to the characteristic "cost per request" with "measurement: $" and may denote the properties "value: 0.05" and "comparator: equals". Furthermore, as another example, an entity node 101 labeled "Company X" may be connected by an entity-characteristic feature relationship edge 106 to a characteristic node 104 labeled "high reliability". This may represent the idea that Company X only uses extremely reliable APIs when developing applications.

In addition to the feature relationship edges discussed above, other edge types are also contemplated within core structure 100 in some embodiments. For example, an entity-API relationship edge 105 may represent various relationships between entities and APIs of the API ecosystem. In particular entity-API relationship edge 105 may represent an invocation relationship or provisioning relationship. Likewise, application-API relationship edge 111 may represent an invocation or provisioning of an API (e.g., for use in a mash-up). Other categories of relationship edges may include edges between nodes of the same type (e.g., connection relationship edges 108, 109, 112, and 114).

In some embodiments, each of these relationships 105-114 may include certain temporal information that denote state property and utilize captured time stamps of events in activation and deactivation properties. For example, on creation, a relationship may include a first activation property, representing the creation date. Subsequent re-establishments of that relationship may produce additional activation properties, thus capturing the relationship's currentness and relevance. For example, an invocation form of an entity-API relationship edge 105 may keep track of the evolution of when and to what extent an entity node 101 consumes (e.g., uses) an API node 102. With the creation and each re-establishment, the relationship's state property will be set to active. On the other hand, in some embodiments, deletion of a relationship will not result in its data to be dismissed. Rather, a deactivation property may capture the time of the deletion and the relationship's state property may be set to inactive. This way, knowledge about the prior existence of a relationship is not lost due to data dismissal. Further, a history, for example about frequent changes of a relationship's state, may reveal patterns of interest. Using this mechanism, relationships may, in some embodiments, also be marked inactive automatically if they are not established for a certain period of time.

In some embodiments where large amounts of data are collected, one potential concern may be the accumulation of data, which could eventually negatively impact performance. To avoid this, ancient data could be summarized, stating for example the amount of re-establishments in a certain time period within one property. In such embodiments, a trade-off between amount of data and its granularity may need to be chosen by the user.

In some embodiments, by capturing the above temporal information, a database of such information may be made available for tracking the usage of related API ecosystem components. For example, this information may be used to determine whether a given API is being consumed more frequently or less frequently, by respective entities. More generally, the temporal information could enable users to gain insights into the API ecosystem as a whole and whether or under what circumstances certain APIs may best be used.

While the components and relationships are described above as being represented in the form of an API exploration graph database, it contemplated that, in some embodiments, the methods described herein may be performed using any applicable API exploration data structure that is capable of representing the relevant information. For example, in some embodiments, API exploration data structures used in API recommendation may take the form of spreadsheets or charts. These charts may include some cells that represent edges and other cells that represent nodes. Further, in some embodiments, these API exploration data structures may take the form of a relational database or a Resource Description Framework (RDF) data model. Moreover, an RDF data model may be used to represent the property information of the nodes and edges of an API exploration graph database.

Figure 2:
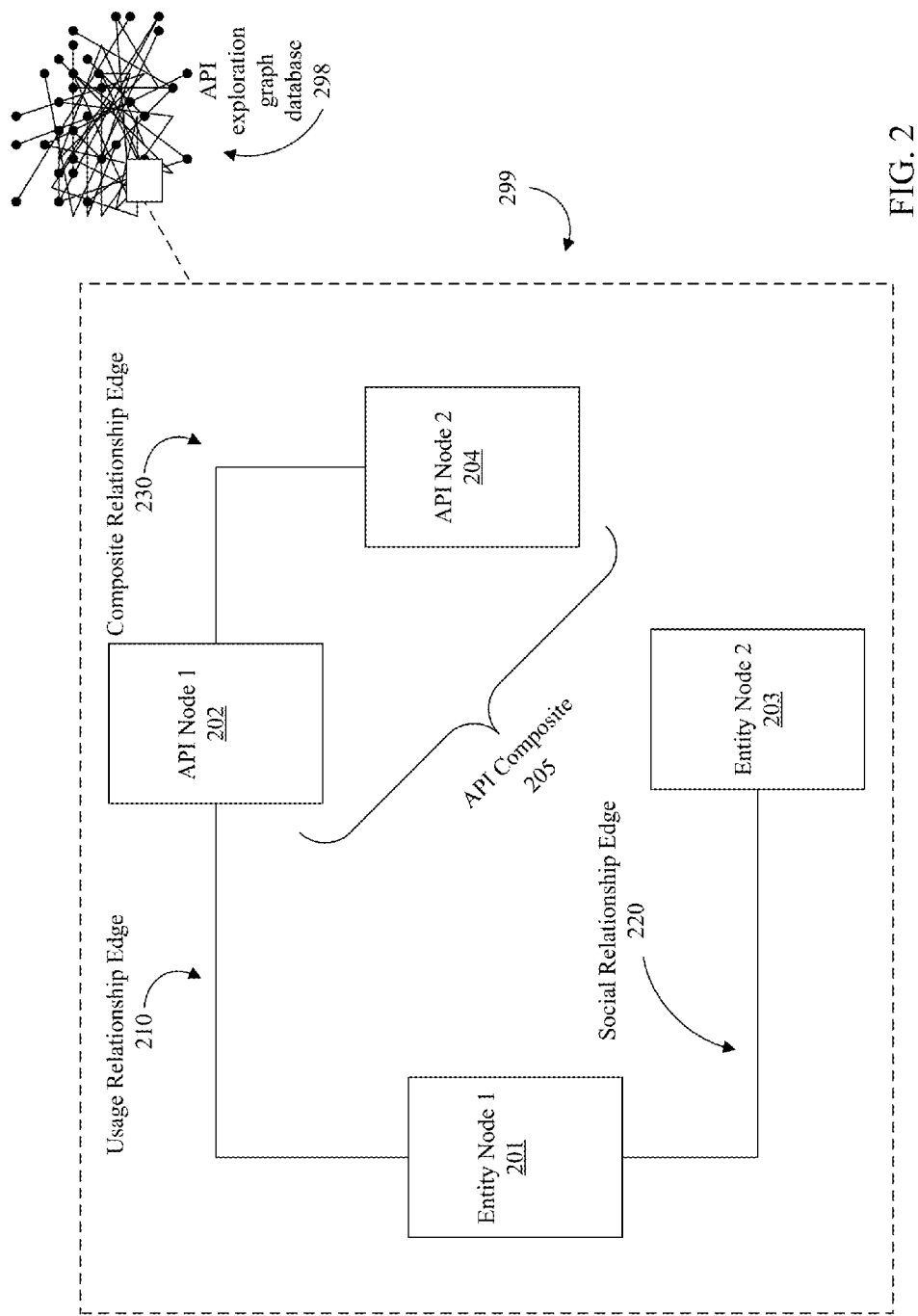
FIG. 2 illustrates a close-up view of a portion of an example API exploration graph database, the close-up view

Turning now to FIG. 2, shown is a close-up view of a portion 299 of an example API exploration graph database 298, the close-up view 299 depicting a usage relationship edge 210, a social relationship edge 220, and a composite relationship edge 230, in accordance with embodiments of the present disclosure. In some embodiments, the API exploration graph database may include any number of API ecosystem component nodes connected by any number of relationship edges. These nodes and edges may include the types shown in core structure 100 of FIG. 1 (e.g., entity nodes, API-characteristic feature relationship edges, etc.). On the other hand, in some embodiments, the components of the API exploration graph database 298 may be limited to only a few different types of nodes (e.g., the API exploration data structure may include only entity nodes and API nodes and may not include characteristic nodes or application nodes).

The close up-view of a portion 299 of graph database 298 includes four nodes 201-204 and three edges 210, 220, and 230. As depicted, entity node 201 is connected to API node 202 by a usage relationship edge 210. As used herein, a usage relationship may refer to any situation where an entity uses (e.g., invokes, provisions, or otherwise consumes) an API. In some embodiments, a usage relationship may be represented by the entity-API relationship edge 105 of FIG. 1. Entity node 201 is also connected via a social relationship edge 220 to entity node 203. As used herein, a social relationship may refer to any applicable direct relationship between two different entities. In some embodiments, a social relationship may be represented by the entity-entity connection relationship edge 108 of FIG. 1. Examples of social relationships may include representations of real-world relationships (e.g., friendship, employment relationship, etc.). Other examples of social relationships may include situations where one entity chooses to track, within the API ecosystem, the actions of another entity, for example, those they admire (this may be similar to "following" or other related concepts used in social networking websites).

Also depicted within the portion 299 is the API node 202 connected to API node 204 by a composite relationship edge 230. In some embodiments, a composite relationship edge 230 may represent the link between two APIs of an API composite. In this instance, an API composite 205 includes APIs 202 and 204. As used herein, an API composite may refer to a set of (i.e., one or more) APIs that can be used to deliver a functionality. In some embodiments, two or more APIs of an API composite may be considered related in at least one aspect and may be deemed usable together. For example, an API composite may include a collection of APIs determined to be usable together for delivering a specific business functionality by integrating the functionalities of the APIs of the collection (e.g., an API composite x may be configured to deliver a composite functionality a by integrating functionality b from an API y with a functionality c from an API z). In some embodiments, multiple APIs making up a given API composite may have been developed independently of each other. Moreover, in some embodiments, the APIs forming the API composite could potentially never have actually been used together before the API composite is recognized in the API exploration data structure (e.g., where the analysis of the API exploration data structure alone, without any actual, relevant usage, leads to the recognition and labeling of an API composite).

While the API composite 205 is depicted as including two APIs that have a direct relationship together, it is contemplated that, in some embodiments, multiple APIs may be considered to be part of the same API composite in situations where they are not directly connected by an edge in a graph database. For example, in an API exploration graph database that includes a characteristic node, a particular API composite may include (e.g., may be defined by) all of the individual APIs that are linked by edges to the characteristic node.

Turning now to FIGS. 3A and 3B, shown is a flowchart of an example method 300 for recommending an API composite using an API exploration data structure, in accordance with embodiments of the present disclosure. The method 300 may begin at block 301 where a recommendation engine receives an input query associated with a topic from a first entity. In some embodiments, the recommendation engine may be associated with an integrated development environment (IDE) and the first entity may be a software developer that is using the IDE. As used herein, an input query may refer to one or more words that form a search term or request for data, information, or knowledge about the topic. The input query may be expressed in the form of one or more keywords or posed as a question about a topic of interest to an entity. In some embodiments, using restricted syntax for questions posed by entities may be enabled. The use of restricted syntax may result in a variety of alternative expressions that assist entities in better stating their needs. In some embodiments, an input query may be an implied (rather than an explicit) question. An example of relevant input query may include an entity search for the phrase "college planning" in an API catalogue. Another example may include a user typing the phrase "weather tracking" as part of an application script in an IDE. In the latter example, the IDE may interpret the script input as a question and may forward the phrase to the recommendation engine.

Next, per block 302, the recommendation engine may access at least a portion of an API exploration data structure based upon the input query. The API exploration data structure may include any of the API exploration data structures described herein. In some embodiments, the API exploration data structure may be a complete model of the relevant API ecosystem (e.g., an API exploration data structure including all of the developers that use a particular IDE, as well as all of the APIs that are available within the IDE). Further, in some embodiments, the accessed portion of the API exploration data structure may include the entire API exploration data structure. Further, in some embodiments the accessed portion may include less than the entire API exploration data structure. The portion of the API exploration data structure that is accessed may be selected from the entire API exploration data structure using various techniques. For example, a preliminary analysis may be performed in order to determine which part of the API exploration data structure is likely to include nodes or edges that are relevant to the first entity, the topic, or both.

In some embodiments, among the components and relationships represented in the API exploration data structure, there may be representations of entities (including the first entity), representations of APIs, and representations of usage relationships between APIs and entities. Other components and relationships may also be represented in the API exploration data structure. For example, in some embodiments, there may be representations of applications and characteristic, as well as representations of relationships between them. In some embodiments, as part of analyzing the API exploration data structure or separately, the recommendation engine may locate the representation of the first entity within the API exploration data structure. Further, in some embodiments, the input query may include a description of the location of the first entity.

Next, per block 303, the recommendation engine may calculate a similarity score for each entity of a set of entities represented in the selected (e.g., accessed) portion of the API exploration data structure. In some embodiments, a similarity score may be calculated for each particular entity by comparing the relationships of that particular entity (e.g., the edges that are connected to the node representing that particular entity) to the relationships of the first entity (e.g., the edges that are connected to the node representing the first entity). Each similarity score may be a measure of the relatedness of a given entity to the first entity based on a number of similarity factors. These factors may include, for example, the extent to which the first entity and the given entity: are connected by any social relationships, have similar or overlapping usage relationships with APIs, have similar characteristics, etc. It is contemplated that factors may be weighted differently and that not all factors may be applicable in every situation (e.g., usage relationships may be weighted more heavily in the scoring than comparable social relationships). In some embodiments, a similarity rule may be used to determine similarity scores. As used herein, a similarity rule may refer to a rule (e.g., an algorithm, a set of algorithms, or a set of other procedures) that may rely on inputting values for variables, in order to output a score that may be indicative of, among potentially other things, the relatedness of two entities.

Next, per decision block 304, a determination may be made as to whether the similarity score calculated in block 303 exceeds a threshold (e.g., minimum level of similarity). In some embodiments, a threshold may refer to a quantitative minimum; in other embodiments, a threshold may be determined by reference to other similarity scores (e.g., in the top 35% of similarity scores). If the similarity score does not exceed the threshold, then, per block 305, the recommendation engine may decide that this particular entity should not be included within a first network. If, however, the similarity score exceeds the threshold, then, per block 306, the recommendation engine may decide that the entity will be included within the first network.

Next, per decision block 307, a determination may be made as to whether there are any remaining entities represented in the API exploration data structure which still need to be scored. If yes, then the next entity is selected and blocks 303-307 are repeated for that entity. Once all of the relevant entities have been scored, the first network is generated by grouping together the included entities (e.g., those entities associated with similarity scores above the threshold), per block 308. As used herein, the first network may refer to a collection of entities all having similarity scores above the threshold. In some embodiments, the network may effectively be a group of entities that are all relatively similar to the first entity.

Next, per block 309, a related API group may be generated by grouping together APIs that have relationships with the first network. More specifically, in some embodiments, the related API group may be determined based on usage relationships. The related API group may include all the APIs represented in the API exploration data structure (or in the accessed portion of the API exploration data structure) that have at least one usage relationship with at least one of the entities of the first network. In some embodiments, each usage relationship may be represented by a usage relationship edge connecting an API node to an entity node (e.g., as shown in FIG. 2).

Once the related API group is established, the recommendation engine may identify API composites based on the topic associated with the input query received in block 301. In some embodiments, per block 310, this identification of API composites may include conducting a search for the topic. In some embodiments, the search for the topic may take the form of keyword search of all of the APIs of the related API group. Other features may also be included in the search, for example, using link analysis to sort among the relevant APIs. Based on the results of the search, applicable API composites may be identified, per block 311. In some embodiments, only API composites that include at least one API included in the related API group may be included in the search results.

Next, per block 312, a quality rating may be calculated for each identified API composite. As used herein, a quality rating may be a measure of the quality a given API composite. Many different quality factors may be used in calculating these ratings. Quality factors that may be considered may include the number of invocations of that API composite (or any of the APIs making up the composite) over a given time period, the last time that API composite was used, the availability of that API composite, the cost of that API composite (e.g., as a sum of the costs of the APIs included in the composite), the risk level of the provider of the API composite, etc. Once all of the relevant API composites have been rated, then, per block 313, the API composites may be ranked according to their ratings. Then, per block 314, at least the highest-rated API composite may be presented to the first entity. In some embodiments, multiple API composites may be presented, for example, all of the ranked API composites may be presented in an ordered list.

Other variants on the example method 300 are also contemplated. For example, in some embodiments, once an API composite is presented to the first entity, the first entity may be prompted to provide feedback about the API composite or other ranked API composites. This feedback may then be used to modify the API exploration data structure. Further, in some embodiments, the actions taken by the first entity in response to the presentation may also be included in the API exploration data structure. For example, if the first entity provisions the highest-rated API, then a usage relationship between the first entity and that API may be added to the API exploration data structure. Also, in some embodiments of example method 300, no rating system may be implemented and instead all of the API composites identified in the search may be presented to the first entity without any ranking comparison between them.

An example of the method 300 being used in an example scenario will be provided. Turning now to FIG. 4, shown is a close-up view of a portion 499 of an example API exploration graph database 498, the close-up view depicting relationships between four entity nodes 401-404, six API nodes 405-410, and one characteristic node 411, in accordance with embodiments of the present disclosure. This example scenario involves a software developer (first entity) employed at small software development company using an IDE. The software developer in this scenario hopes to develop a program that can be used to help middle school math instructors teach their students.

The software developer begins by opening a new window in the IDE and enters the phrase (input query) "middle school math" (topic) into an API catalogue search box. The input query is then received (per block 301 of FIG. 3A) by a recommendation engine associated with the IDE. The recommendation engine then accesses a portion 499 of API exploration graph database 498 (per block 302). In this example, the API exploration graph database 498 includes nodes representing all of the APIs available through the IDE (including APIs 405-410), all of the software developers that use the IDE (including entities 401-404), and certain characteristics (including characteristic 411). The API exploration graph database 498 also includes relationship edges between these nodes. The recommendation engine is able to locate the software developer as entity node 401 in the API exploration graph database. Because the software developer has invoked one particular API (represented by API node 405) on several occasions, a usage relationship edge is depicted as connecting the entity node 401 to the API node 405 within the accessed portion 499 of the API exploration graph database 498. It is contemplated other relevant relationships and nodes may exist that are not shown in the figure (for the sake of simplicity).

Based on an analysis of the API exploration graph database 498, the recommendation engine is able to calculate a similarity score (per block 303) for each of the entities represented in the accessed portion 499 of the API exploration graph database 498. Each similarity score is calculated based on comparing the represented relationships of a particular entity to the represented relationships of the software developer. In this example, the similarity score for entity node 403 is calculated as being relatively high because the node represents a second software developer that also works at a small software development company and likes to use many of the same APIs as the first software developer. Likewise, a high similarity score is calculated for entity node 404 because that node represents a third software developer that also has similar interests to the first software developer. The entity node 402, however, represents a software developer that works at a large financial institution. Because this software developer uses APIs that tend to be very different from the APIs used by the first software developer, a low similarity score is given to entity node 402.

To continue the example, each similarity score is compared to a threshold (per block 304). In this instance, both entity node 403 and entity node 404 have similarity scores above the threshold and a determination is made (per block 306) to include them both in a first network. Because entity node 402 is associated with a similarity score below the threshold, a determination is made (per block 305) not to include it in the first network. Once all of the entities have been scored (per block 307), the first network is generated (per block 308). In this instance the first network includes entity 403 and entity 404.

Next, a related API group is generated (per block 309) based on the usage relationships of the entities included in the first network. In this instance, the related API group includes API nodes 407-409. API nodes 406 and 410 are not included in the related API group as they do not have any usage relationships with entities of the first network (e.g., entity 403 or entity 404). A search for the topic "middle school math" within the related API group is then performed by the recommendation engine (per block 310). In this instance, the API composites identified based on the search (per block 311) include APIs 407 and 409 (e.g., two API composites including one API each). This may occur because API 407 and API 409 include materials about teaching algebra and teaching basic trigonometry, respectively (both associated with "middle school math"), while API 408 includes material about teaching fly fishing (not associated with "middle school math").

To continue the example, a quality rating is calculated for each of APIs 407 and 409 (per block 312). In this instance, API 407 is associated with a very respectable textbook publishing company and is given a high rating. API 409 is associated with a relatively unknown API provider and is given a low rating. The API composites are then ranked (per block 313), with API 407 being ranked above API 409. To complete the example, API 407 is returned to the software developer (per block 314) as the result of his search of the API catalogue. The software developer may then choose to select the API in the catalogue and incorporate it into his new program.

Active learning may also play a role in some embodiments of the disclosure. Turning now to FIG. 5, shown is a flowchart of an example method 500 for using active learning to improve an API exploration data structure, in accordance with embodiments of the present disclosure. The example method 500 may begin at block 501 with a recommendation engine selecting an API represented in an API exploration data structure for annotation. In some embodiments, the selection may be made by applying a learning algorithm. As used herein, a learning algorithm may refer to a type of algorithm that is used by a learner in a machine learning process in order to determine which data points should be labeled (e.g., annotated) by a teacher. By having the learner (rather than the teacher) select the data points for labeling, the process of machine learning may be optimized. In the context of some embodiments, the recommendation engine may be considered the learner and the teacher may be one or more entities represented in the API exploration data structure. The APIs selected for labeling may be those about which relatively little information is known (for example, an API node having few or no usage relationship edges may be more likely to be selected for labeling than a comparable API node that is already connected to several other nodes in the API exploration data structure).

Once the API node is selected, then, per block 502, a request to annotate the node may be sent to one or more entities represented in the API exploration data structure. In some embodiments, the request may take the form of an electronic survey or other request for feedback. For example, insight could be gleaned from the answer to a question such as "How would you rate the publisher of API x?" In response to the request, an entity may annotate the node (for example, by answering a survey question) and then send the response back to the recommendation engine, per block 503. The received annotation may then be used by the recommendation engine, per block 504, for updating the API exploration data structure. For example, the annotation may be useful in increasing the number of known relationships that are had by a given API node.

The concept of using active learning to modify an API exploration data structure may be illustrated by continuing the scenario discussed in reference to FIG. 4. Specifically, turning now to FIG. 6, shown is a second close-up view of the portion 499 of the example API exploration graph database 498, wherein the API exploration graph database 498 has been updated using active learning, in accordance with embodiments of the present disclosure. In this new example, the recommendation engine applies an embodiment of example method 500 to the API exploration graph database 498.

The recommendation engine begins by using a learning algorithm in order to determine which API node in graph database 498 should receive additional labeling. Based on the algorithm (per block 501) the API node 410 may be selected. This may occur, for example, because this particular node is currently poorly labeled (e.g., not connected to any other nodes in the graph database). Next, the recommendation engine may send a request for more information about API 410 (per block 502) to the software developer represented by entity node 402. This request may take the form of a pop-up window on the computer screen of entity 402 that asks the entity to "please provide us with two terms that you think best describe API x[API 410]." In this example, API 410 relates to materials that provide creative graphic user interfaces that are helpful for middle school students with learning disabilities. Accordingly, entity 402 enters the terms "middle school" and "learning disabilities" in the pop-up window. This response is then sent back to the recommendation engine (per block 503). The recommendation engine may then update the API exploration graph database 498 (per block 504) based on the response. In this example, characteristic node 411 is "middle school topics". Accordingly, a new relationship edge 650 may be created between the API node 410 and the characteristic node 411 (because of entity 402's use of the term "middle school" in his response). Further, as a result this new relationship edge 650, a new API composite 660 (including both API 409 and API 410) may be identified (e.g., created) in the API exploration data structure 498.

By using active learning to improve an API exploration data structure, a recommendation engine may ultimately be able to present a different set of API composite recommendations to entities seeking APIs. This may be illustrated by considering what may have been different if the first software developer discussed in reference to FIG. 4 had entered his input query of "middle school math" after (rather than before) the updating discussed in reference to FIG. 6 had occurred (i.e., if the graph database 498 had been supplemented as shown in FIG. 6 at the time of the input query). In such a scenario, everything may have occurred in the same manner until the search for the topic "middle school math" within the related API group was performed by the recommendation engine. At that point in time, rather than identifying only API 407 and API 409 as relevant API composites (as was the case before), the recommendation engine may have also identified a third API composite, namely, new API composite 660. Taking this idea a step further, the software developer may have ultimately been presented (e.g., after the rating, ranking, etc.) with API composite 660 rather than API 407. This may have proven more valuable to the software developer. For example, a composite functionality (created by new API composite 660) of teaching algebra (from API 409) and using creative GUI's that help students with learning disabilities (from API 410) may be more useful for his program than a functionality of teaching basic trigonometry (from API 407 alone).

Turning now to FIG. 7, shown is a high-level diagram of an example computer network 750 configured to perform one or more of the methods described herein, in accordance with embodiments of the present disclosure. Included within network 750 are computers 702-714. Each of these computers may be any relevant computer system or combination of computer systems including, for example, servers, desktops, laptops, mobile phones, smart phones, tablets, personal or enterprise digital assistants, and the like. Further, the seven computers 702-714 of FIG. 7 are shown for illustrative purposes only; it is contemplated that dozens, hundreds, or any number of computers may be used in some embodiments.

Located on computer 710 may be a recommendation engine 720 configured to perform embodiments of one or more of the methods described herein. Included within recommendation engine 720, may be a database 730 which may store an API exploration data structure 798. In some embodiments, API exploration data structure 798 may be an API exploration graph database.

In some embodiments, the network 750 may be implemented by any number of any suitable communications media (e.g., wide area network (WAN), local area network (LAN), Internet, Intranet, etc.). Alternatively, the computers of network 750 may be local to each other, and communicate via any appropriate local communication medium (e.g., local area network (LAN), hardwire, wireless link, Intranet, etc.). In some embodiments, the network 750 may be implemented within a cloud computing environment, or using one or more cloud computing services. A cloud computing environment may include a network-based, distributed data processing system that provides one or more cloud computing services.

Turning now to FIG. 8, shown is a high-level block diagram of an example computer system (i.e., computer) 801 that may be used in implementing one or more of the methods described herein, in accordance with embodiments of the present disclosure. In some embodiments, computer system 801 may be representative of any of computers 702-714 of FIG. 7. Further, in some embodiments, the major components of the computer system 801 may comprise one or more CPUs 802, a memory subsystem 804, a terminal interface 812, a storage interface 814, an I/O (Input/Output) device interface 816, a network interface 818, and an API exploration data structure interface 820, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may comprise one or more levels of on-board cache.

In some embodiments, the memory subsystem 804 may comprise a random-access semiconductor memory, storage device, or storage medium (either volatile or non-volatile) for storing data and programs. In some embodiments, the memory subsystem 804 may represent the entire virtual memory of the computer system 801, and may also include the virtual memory of other computer systems coupled to the computer system 801 or connected via a network. The memory subsystem 804 may be conceptually a single monolithic entity, but, in some embodiments, the memory subsystem 804 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

In some embodiments, the main memory or memory subsystem 804 may contain elements for control and flow of memory used by the CPU 802. This may include all or a portion of the following: a memory controller 805, one or more memory buffers 806A and 806B and one or more memory devices 825A and 825B. In some embodiments, the memory devices 825A and 825B may be dual in-line memory modules (DIMMs), which are a series of dynamic random-access memory (DRAM) chips 807A-807D (collectively referred to as 807) mounted on a printed circuit board and designed for use in personal computers, workstations, and servers. The use of DRAMs 807 in the illustration is exemplary only and the memory array used may vary in type as previously mentioned.

Although the memory bus 803 is shown in FIG. 8 as a single bus structure providing a direct communication path among the CPUs 802, the memory subsystem 804, and the I/O bus interface 810, the memory bus 803 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smart phone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary. Further, in some embodiments, the computer system 801 may include one or more circuits (e.g., combinations of electronic components through which electric current may flow) that are configurable to perform one or more of the methods described herein.

As discussed in more detail below, it is contemplated that some or all of the steps of some of the embodiments of methods described herein may be performed in alternative orders or may not be performed at all; furthermore, multiple steps may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of using an application programing interface (API) exploration data structure, the API exploration data structure including nodes and further including edges that represent relationships between the nodes, wherein each node of a first subset of the nodes represents a different entity of a set of entities that are users of APIs, and wherein each node of a second subset of the nodes represents a different API of a set of APIs, the method comprising:
   receiving, from a first entity, an input query associated with a topic;
   accessing, based upon the input query, at least a portion of the API exploration data structure;
   comparing, for each particular entity of the set of entities, edge-based relationships within the API exploration data structure of each particular entity to edge-based relationships within the API exploration data structure of the first entity to calculate a relationship-similarity score with the first entity for each particular entity of the set of entities;
   comparing each similarity score to a threshold;
   generating a first network by grouping together entities from the set of entities that have similarity scores above the threshold;
   generating a related API group by grouping together APIs from the set of APIs that have edge-based relationships with the first network;
   identifying, based on the topic, an API composite including at least one API of the related API group; and
   presenting the API composite to the first entity.

2. The method of claim 1, wherein the API composite is configured to deliver a composite functionality by integrating a first functionality of the at least one API and a second functionality of at least one additional API represented in the API exploration data structure.

3. The method of claim 1, wherein the API composite further includes at least one additional API of the set of APIs, and wherein the API exploration data structure further includes an edge that represents a composite relationship, the composite relationship being a relationship between the at least one API and the at least one additional API.

4. The method of claim 3, wherein the at least one API and the at least one additional API were independently developed.

5. The method of claim 1, further comprising:
   identifying, based on the topic, a second API composite including a second at least one API of the related API group;
   calculating a first quality rating for the API composite presented to the first entity and a second quality rating for the second API composite;
   comparing the first quality rating to the second quality rating; and
   ranking, based on the comparing the first quality rating to the second quality rating, the API composite presented to the first entity and the second API composite.

6. The method of claim 1, further comprising:
   receiving, from the first entity, feedback relating to the API composite; and
   updating, based on the feedback, the API exploration data structure.

7. The method of claim 1, further comprising:
selecting, using a learning algorithm, the at least one API for an annotation;
requesting the annotation from a second user;
receiving, in response to the requesting, the annotation from the second user; and
updating, based on the annotation, the API exploration data structure.

8. The method of claim 7, wherein the API composite further includes at least one additional API of the set of APIs, and wherein the updating the API exploration data structure comprises creating an edge that represents a composite relationship between the at least one API and at least one additional API.

9. The method of claim 8, wherein the updating the API exploration data structure causes the API composite to be presented to the first entity.

10. A computer program product for using an application programing interface (API) exploration data structure, the API exploration data structure including nodes and further including edges that represent relationships between the nodes, wherein each node of a first subset of the nodes represents a different entity of a set of entities that are users of APIs, and wherein each node of a second subset of the nodes represents a different API of a set of APIs, the computer program product comprising a computer readable storage medium having program instructions embodied thereon, the program instructions executable by a computer to cause the computer to:
receive, from a first entity, an input query associated with a topic;
access, based upon the input query, at least a portion of the API exploration data structure;
compare, for each particular entity of the set of entities, edge-based relationships within the API exploration data structure of each particular entity to edge-based relationships within the API exploration data structure of the first entity to calculate a relationship-similarity score with the first entity for each particular entity of the set of entities;
compare each similarity score to a threshold;
generate a first network by grouping together entities from the set of entities that have similarity scores above the threshold;
generate a related API group by grouping together APIs from the set of APIs that have edge-based relationships with the first network;
identify, based on the topic, an API composite including at least one API of the related API group; and
present the API composite to the first entity.

11. The computer program product of claim 10, wherein the API composite is configured to deliver a composite functionality by integrating a first functionality of the at least one API and a second functionality of at least one additional API represented in the API exploration data structure.

12. The computer program product of claim 10, wherein the API composite further includes at least one additional API of the set of APIs, and wherein the API exploration data structure further includes an that represents a composite relationship, the composite relationship being a relationship between the at least one API and the at least one additional API.

13. The computer program product of claim 10, wherein the program instructions are executable by the computer to further cause the computer to:
identify, based on the topic, a second API composite including a second at least one API of the related API group;
calculate a first quality rating for the API composite presented to the first entity and a second quality rating for the second API composite;
compare the first quality rating to the second quality rating; and
rank, based on the comparing the first quality rating to the second quality rating, the API composite presented to the first entity and the second API composite.

14. The computer program product of claim 10, wherein the program instructions are executable by the computer to further cause the computer to:
select, using a learning algorithm, the at least one API for an annotation;
request the annotation from a second user;
receive, in response to the requesting, the annotation from the second user; and
update, based on the annotation, the API exploration data structure.

15. A system for using an application programing interface (API) exploration data structure, the API exploration data structure including nodes and further including edges that represent relationships between the nodes, wherein each node of a first subset of the nodes represents a different entity of a set of entities that are users of APIs, and wherein each node of a second subset of the nodes represents a different API of a set of APIs, the system comprising one or more circuits configured to perform a method comprising:
receiving, from a first entity, an input query associated with a topic;
accessing, based upon the input query, at least a portion of the API exploration data structure;
comparing, for each particular entity of the set of entities, edge-based relationships within the API exploration data structure of each particular entity to edge-based relationships within the API exploration data structure of the first entity to calculate a relationship-similarity score with the first entity for each particular entity of the set of entities;
comparing each similarity score to a threshold;
generating a first network by grouping together entities from the set of entities that have similarity scores above the threshold;
generating a related API group by grouping together APIs from the set of APIs that have edge-based relationships with the first network;
identifying, based on the topic, an API composite including at least one API of the related API group; and
presenting the API composite to the first entity.

16. The system of claim 15, wherein the API composite is configured to deliver a composite functionality by integrating a first functionality of the at least one API and a second functionality of at least one additional API represented in the API exploration data structure.

17. The system of claim 15, wherein the API composite further includes at least one additional API of the set of APIs, and wherein the API exploration data structure further includes an edge that represents a composite relationship, the composite relationship being a relationship between the at least one API and the at least one additional API.

18. The system of claim 15, wherein the one or more circuits are further configured to perform the method comprising:

identifying, based on the topic, a second API composite including a second at least one API of the related API group;

calculating a first quality rating for the API composite presented to the first entity and a second quality rating for the second API composite;

comparing the first quality rating to the second quality rating; and ranking, based on the comparing the first quality rating to the second quality rating, the API composite presented to the first entity and the second API composite.

19. The system of claim 15, wherein the one or more circuits are further configured to perform the method comprising:

receiving, from the first entity, feedback relating to the API composite; and updating, based on the feedback, the API exploration data structure.

20. The system of claim 15, wherein the one or more circuits are further configured to perform the method comprising:

selecting, using a learning algorithm, the at least one API for an annotation;

requesting the annotation from a second user;

receiving, in response to the requesting, the annotation from the second user; and updating, based on the annotation, the API exploration data structure.

\* \* \* \* \*